United States Patent
Lovegrove

(10) Patent No.: US 11,829,465 B2
(45) Date of Patent: Nov. 28, 2023

(54) EDGE COMPUTING DEVICE WITH CONNECTOR PIN AUTHENTICATION FOR PERIPHERAL DEVICE

(71) Applicant: MORPHIX, INC., Vancouver, WA (US)

(72) Inventor: Jonathan Lovegrove, Yacolt, WA (US)

(73) Assignee: MORPHIX, INC., Vancouver, WA (US)

(*) Notice: Subject to any disclaimer, the term of this patent is extended or adjusted under 35 U.S.C. 154(b) by 226 days.

(21) Appl. No.: 17/077,982

(22) Filed: Oct. 22, 2020

(65) Prior Publication Data

US 2022/0129535 A1 Apr. 28, 2022

(51) Int. Cl.
| | |
|---|---|
| G06F 21/00 | (2013.01) |
| H04L 29/06 | (2006.01) |
| G06F 21/44 | (2013.01) |
| G06F 21/85 | (2013.01) |
| G06F 13/40 | (2006.01) |
| H04L 9/40 | (2022.01) |
| G06F 21/60 | (2013.01) |

(52) U.S. Cl.
CPC ............ *G06F 21/44* (2013.01); *G06F 13/409* (2013.01); *G06F 13/4068* (2013.01); *G06F 21/602* (2013.01); *G06F 21/85* (2013.01); *H04L 63/0853* (2013.01)

(58) Field of Classification Search
CPC .... G06F 13/4068; G06F 21/44; G06F 21/602; G06F 21/85; H04L 63/0853
See application file for complete search history.

(56) References Cited

U.S. PATENT DOCUMENTS

| | | | | |
|---|---|---|---|---|
| 7,877,788 | B1* | 1/2011 | Topp | G06F 21/44 726/17 |
| 2005/0149745 | A1* | 7/2005 | Ishidoshiro | G06F 21/602 713/189 |
| 2007/0043994 | A1* | 2/2007 | Rosen | G11C 29/56 714/E11.159 |
| 2011/0126005 | A1* | 5/2011 | Carpenter | G06F 13/4068 713/158 |
| 2014/0075067 | A1* | 3/2014 | Mullins | G06F 13/4286 710/105 |
| 2014/0317303 | A1* | 10/2014 | Toprani | H04L 67/141 709/227 |

(Continued)

*Primary Examiner* — Philip J Chea
*Assistant Examiner* — Rodman Alexander Mahmoudi
(74) *Attorney, Agent, or Firm* — Alleman Hall Creasman & Tuttle LLP

(57) ABSTRACT

A computing device is provided that includes a processor having a plurality of pins that are electrically coupled to a plurality of pins of a connector, and a memory device storing a state table that maps the plurality of pins of the connector to a plurality of connection types. The processor is configured to perform an authentication process for at least one connection type to determine whether an authenticated device configured for the at least one connection type is coupled to the connector. The authentication process is performed at least in part by sending an authentication signal to one or more of the plurality of pins of the connector mapped to the at least one connection type, and receiving an expected authentication signal response on one or more of the plurality of pins of the connector mapped to the at least one connection type.

20 Claims, 8 Drawing Sheets

(56) References Cited

U.S. PATENT DOCUMENTS

| | | | |
|---|---|---|---|
| 2014/0361788 A1* | 12/2014 | Wang | G01R 31/70 |
| | | | 324/538 |
| 2015/0317473 A1* | 11/2015 | Lim | G06F 21/44 |
| | | | 726/16 |
| 2020/0371697 A1* | 11/2020 | Kao | G11C 16/22 |

* cited by examiner

EDGE COMPUTING DEVICE WITH CONNECTOR PIN AUTHENTICATION FOR PERIPHERAL DEVICE

BACKGROUND

Internet of Things (IoT) connected devices have recently come to be used in a wide variety of settings, such as manufacturing, transportation, resource extraction, climate control for buildings, and biometrics. These IoT connected devices may include sensors with which the IoT connected devices collect data related to the physical environments in which they are located. In addition, IoT connected devices may include controllable devices that are configured to perform physical actions in response to receiving control signals. The IoT connected device may be configured to communicate with a programmable logic controller (PLC), which may be configured to communicate with an edge computing device. The edge computing device may be configured to communicate with a remotely located server computing device, which may provide cloud computing resources to the edge computing device.

SUMMARY

According to one aspect of the present disclosure, a computing device is provided. The computing device may include a processor having a plurality of pins that are electrically coupled to a plurality of pins of a connector. The computing device may further include a memory device storing a state table that maps the plurality of pins of the connector to a plurality of connection types. The processor may be configured to implement control logic that includes an authentication module configured to perform an authentication process for at least one connection type to determine whether an authenticated device configured for the at least one connection type is coupled to the connector. The authentication process is performed at least in part by sending an authentication signal to one or more of the plurality of pins of the connector mapped to the at least one connection type, and receiving an expected authentication signal response on one or more of the plurality of pins of the connector mapped to the at least one connection type. Based at least on determining that the authenticated device configured for the at least one connection type is coupled to the connector, the processor may be further configured to enable signal transmission between the processor and one or more of the plurality of pins of the connector mapped to the at least one connection type.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Conventional computer systems may be deployed in secure environments that have physical security to prevent attacks by local actors. For example, the server system of an enterprise may be located in a locked room or facility that prevents unknown persons from accessing the hardware of the server system. In contrast, IoT systems may potentially be deployed into uncontrolled environments that cause the IoT system to be locally accessible. An IoT system that is located outdoors, such as an IoT system for farming equipment, may potentially be exposed to unknown persons that are able to physically access that outdoor area. Local physical access to an IoT system may potentially grant these unknown actors new avenues to defeat conventional software security used by the IoT system.

Figure 1:
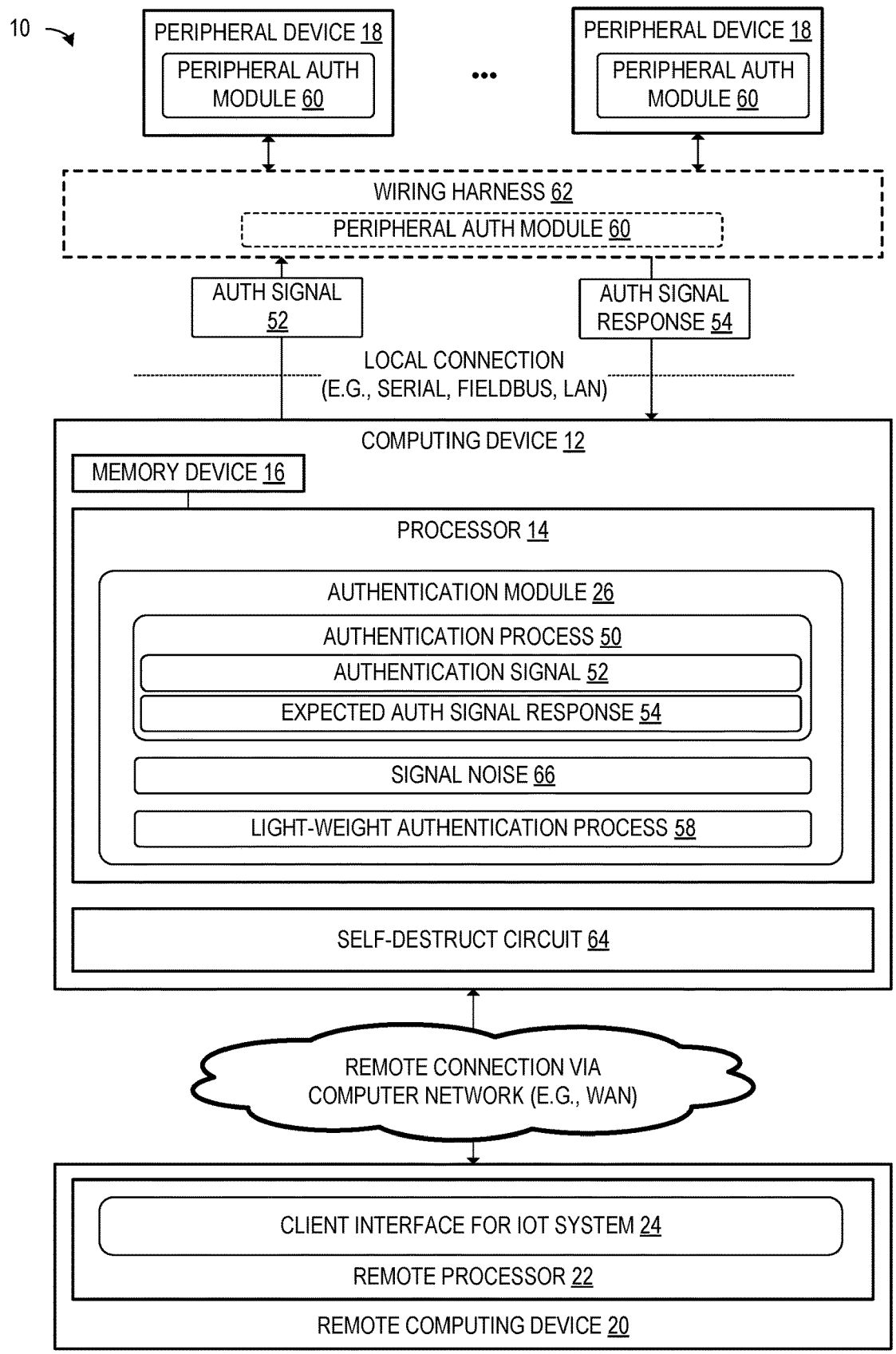
FIG. 1 schematically shows a computing system including a computing device connected to a remote computing device such as a server via a remote connection over a computer network such as a wide area network, and also connected to one or more sensors and a peripheral device via a local connection such as a serial, fieldbus, or LAN connection, according to one example embodiment.

In order to address the above shortcomings of conventional IoT systems, a computing system 10 including a computing device 12 is provided, as schematically shown in the example of FIG. 1. The computing device 12 implements a connector pin-based hardware security protocol that authenticates devices that are coupled to the computing device 12 before allowing signals to be transmitted through the connector pins to the processor 14 of the computing device 12. By disabling communication to the processor 14 until completion of the authentication process, even if an unknown actor is able to gain physical access to the computing device 12, that actor would be unable to communicatively access software being executed by the processor 14 of the computing device 12. In this manner, the computing device 12 provides an additional layer of hardware-based security separate from conventional software security that may be executed by the processor.

The computing device 12 of FIG. 1 may further include memory 16, which may include volatile memory and non-volatile memory. The computing device 12 may be located proximate to one or more peripheral devices 18 in the physical environment and may communicate with the one or more peripheral devices 18 via a wired or wireless local connection. The wired or wireless local connection is typically a serial connection (e.g., universal serial bus (USB), RS-232), fieldbus connection (e.g., GPIB, MAP, MMS, MODBUS, PROFIBUS, INTERBUS, CAN, etc.), local area network (LAN) connection (e.g., wired LAN over Ethernet/IP or wireless LAN), or other suitable local connection that does not include a high latency computer network such as a wide area network (WAN). The one or more peripheral devices 18 may be included in IoT systems such as, to name a few examples, a robot, HVAC system, alarm system, plumbing system, conveyor system, manufacturing applicator, or other controlled system. These examples are not to be considered limiting as numerous other examples are possible. The computing device 12 may be referred to as an edge computing device due to its position on the network topology having a local connection to the one or more peripheral devices 18 and a remote connection to a remote computing device 20.

The computing device 12 may be configured to have a remote connection with the remote computing device 20 over a computer network such as, for example, a WAN. The remote computing device 20 may include a remote processor 22 configured to execute a client interface 24 for the IoT system. The client interface 24 may be configured to communicate with the computing device 12 to authenticate the remote computing device 20 with the computing device 12. Using the client interface 24, a user of the remote computing device 20 may, for example, access data, control tasks for the IoT system, or perform other control processes for the computing device 12 and the locally coupled peripheral devices 18. In one example, communication between the remoting computing device 20 and the computing device 12 may be protected via conventional network security processes.

While the remote computing device 20 may be located in a secured area controlled by the user, the computing device 12 and the peripheral devices 18 may potentially be deployed into unsecured environments that may be locally accessed by unknown actors. To provide an additional layer of security at the local level, the computing device 12 is configured to implement an authentication module 26 executed by the processor 14. In one example, the authentication module 26 may be a program that is included in the firmware of the computing device 12, and may be configured to be execute with high priority upon bootup of the computing device 12. The authentication module 26 may be configured to perform an authentication process to determine whether one or more peripheral devices 18 coupled to the computing device 12 are authenticated devices. An example authentication process will be described in more detail below.

In one example, if the authentication module 26 is unable to authenticate a device coupled to the computing device 12, the authentication module 26 may be configured to disable communication between that device and the computing device 12 through the local connection. As discussed above, the local connection is typically a serial connection (e.g., universal serial bus (USB), RS-232), fieldbus connection (e.g., GPIB, MAP, MMS, MODBUS, PROFIBUS, INTERBUS, CAN, etc.), local area network (LAN) connection (e.g., wired LAN over Ethernet/IP or wireless LAN), or other suitable local connection that does not include a high latency computer network such as a wide area network (WAN).

Figure 2:
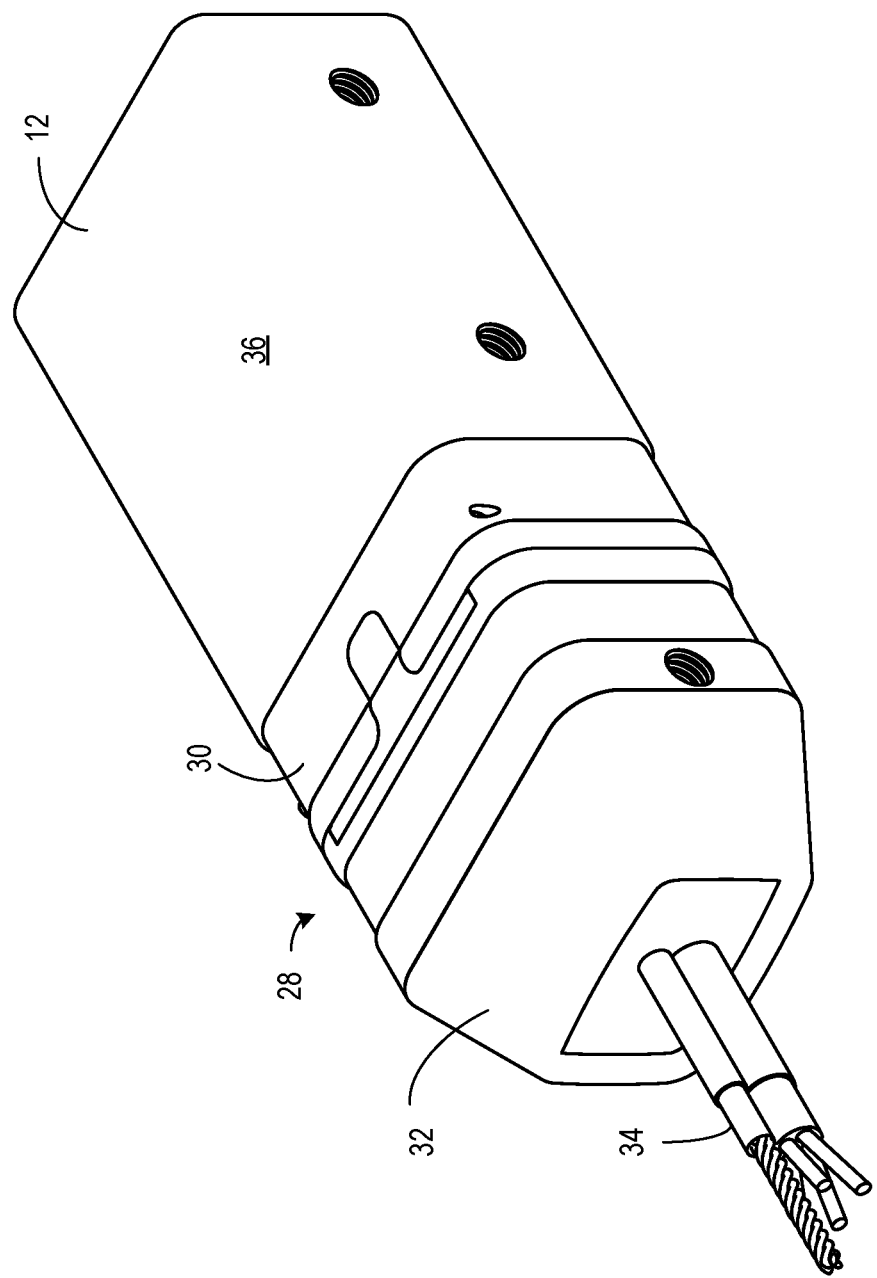
FIG. 2 shows a view of the computing device of FIG. 1 with a connector having a first part and a second part that are engaged to each other.

FIG. 2 illustrates an example of the computing device 12 and an outside view of a connector 28. In the illustrated, the connector 28 includes a first part 30 located on the side of the computing device 12. The first part 30 is configured to couple to a second part 32 of the connector 28 that is located on a side of the one or more peripheral devices 18. The one or more peripheral devices 18 may be coupled to the second part 32 of the connector 28 via a wiring system 34. The computer components of the computing device 12 may be securely enclosed within a housing 36 that protects the computer components from the conditions of the local environment. Local devices such as the one or more peripheral devices 18 may exchange data with the processor 14 of the computing device 12 through the connector 28.

Figure 3:
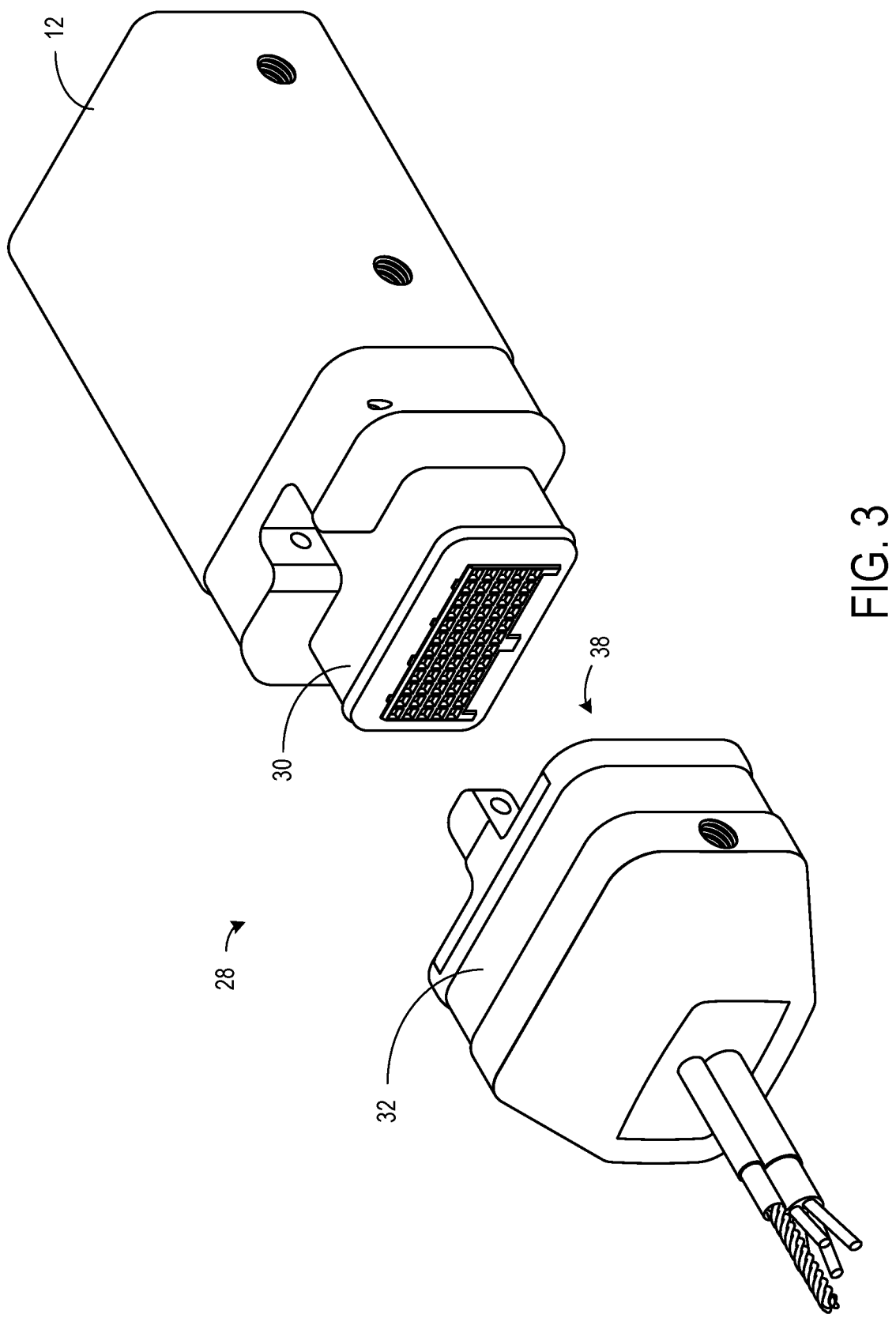
FIG. 3 shows a view of the computing device of FIG. 1 with a connector having a first part and a second part that are currently disengaged from each other.

FIG. 3 illustrates an example of an outside view of the connector 28 in a configuration where the first part 30 and second part 32 are disconnected. As shown, the connector 28 may include a communication pin system. In the illustrated example, the first part 30 of the connector 28 may include receiving connectors for a plurality of pins 38 positioned on the second part 32 of the connector 28. It should be appreciated that other examples, the plurality of pins 38 may be positioned on the first part 30 of the connector 28. By connecting the first part 30 and second part 32 of the connector 28, the one or more peripheral devices 18 wired to the second part 32 of the connector 28 may be communicatively coupled to the computing device 12.

As discussed above, the computing device 12 may potentially be deployed into unsecured environments. A person that has gained access to the local environment of the computing device 12 may potentially attempt to compromise the computing device 12 via connecting a tool or other device to the connector 28 of the computing device 12. For example, the person may attempt to communicate with compromised software installed on the computing device 12 via the connector 28. To provide an additional layer of security to thwart these potential local attacks, the computing device 12 implements the authentication module 26 that performs an authentication process before enabling other signal transmission between the connector 28 and the processor 14.

Figure 4:
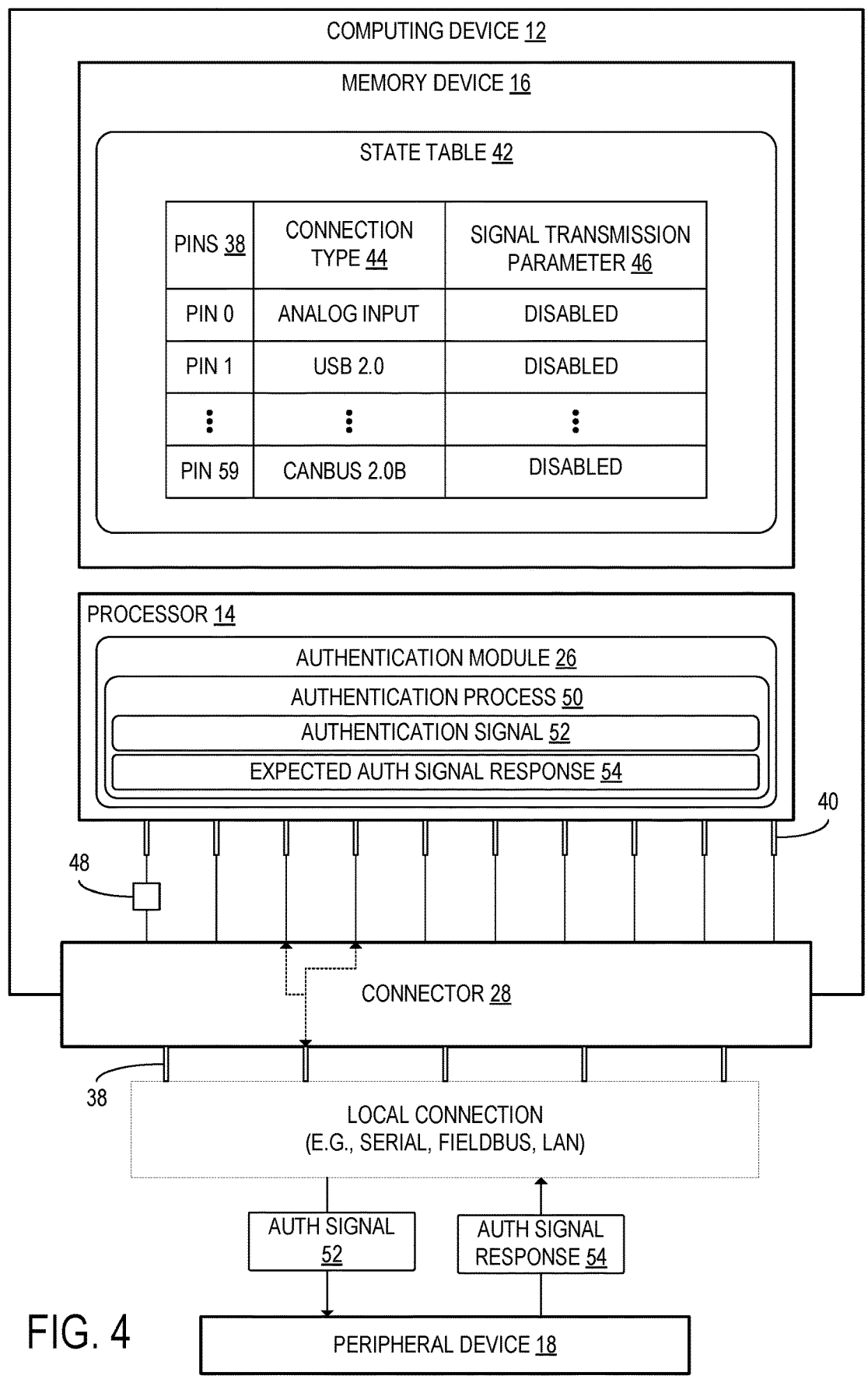
FIG. 4 shows a schematic view of the example computing device of FIG. 1 including connections between pins of a processor of the computing device and pins of a connector of the computing device.

FIG. 4 illustrates a schematic view of the computing device 12 implementing the authentication module 26. The processor 14 has a plurality of pins 40 that are typically inserted into a socket of a circuit board in the computing device 12 that communicatively couples the processor 14 to other computer components of the computing device 12 including the memory device 16 and the connector 28. However, it should be appreciated that the processor 14 and other computer components of the computing device 12 may take other suitable forms such as being integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

As shown in FIG. 4, the plurality of pins 40 of the processor 14 are electrically coupled to a plurality of pins 38 of the connector 28. In one example, the pins 40 of the processor may have one-to-one mappings with pins 38 of the connector 28. However, it should be appreciated that any suitable mapping configuration may be implemented by the computing device 12, such as, for example, a mapping of one pin 40 of the processor 14 and more than one pin 38 of the connector 28, or a mapping of more than one pin 40 of the processor 14 to one pin 38 of the connector.

The memory device 16 of the computing device 12 is configured to store a state table 42 that maps the plurality of pins 38 of the connector 28 to a plurality of connection types

44. In the specific example of FIG. 4, the connector 28 may include sixty pins with reference labels from "PIN 0" to "PIN 59". Each of these pins 38 may be mapped to a connection type 44. The connection types 44 may include analog inputs and connection protocols such as universal serial bus (USB 2.0) and controller area network (CAN) bus. However, it should be appreciated that the connection types 44 are not limited to the examples shown in FIG. 4 and described herein. As a few non-limiting examples, the connection types 44 may include ground, digital input and output, analog voltage input and output, analog current input and output, communication ports such as COM4 UART Tx, pulse width modulation (PWM) inputs and outputs, ethernet, serial peripheral interface (SPI), etc.

Some connection types 44 may be mapped to more than one pin 38 of the connector 28. For example, the CAN Bus 2.0B connection type may be mapped to a plurality of pins 38 of the connector 28. The full mappings may be stored in the state table 42, and managed by the processor 14.

In one example, the state table 42 may further include a signal transmission parameter 46 that tracks whether signal transmission for each connection type 44 has been enabled or disabled. The signal transmission parameter 46 may be modified by the authentication module 26 executed by the processor 14. Several techniques for disabling signal transmission will be described below. However, it should be appreciated that other suitable techniques not specifically described herein for disabling signal transmission to the processor 14 may also be implemented by the computing device 12.

In a first approach, the pins 40 of the processor 14 may be disabled via firmware executed on the processor 14. For example, if the CAN Bus 2.0B connection type 44 is currently disabled, then the authentication module 26 may be configured to cause the one or more pins 40 of the processor 14 that are mapped to corresponding CAN Bus 2.0B pins of the connector 28 to be disabled. By disabling the pins 40 of the processor 14, signal transmission to the processor 14 may be prevented.

In a second approach, the pins 38 of the connector 28 may be disabled based on commands received from the processor 14. For example, the computing device 12 may further include a plurality of intermediate circuit elements 48 located between the plurality of pins 40 of the processor 14 and the plurality of pins 38 of the connector 28. These intermediate circuit elements 48 may be configured to enable or disable signal transmission between the plurality of pins 40 of the processor 14 and the plurality of pins 38 of the connector 28. For example, the intermediate circuit elements 48 may take the form of a resistor, a transformer, an optical isolator, an amplifier, etc. The one or more intermediate circuit elements 48 may be addressable such that they may be switched on and off to enable or disable signal transmission across the intermediate circuit element 48. To disable signal transmission for a pin 38 of the connector 28, the processor 14 may be configured to cause the intermediate circuit element 48 that lies between that pin of the connector 28 and the processor 14 to disable signal transmission across that intermediate circuit element 48.

As another example, the processor 14 may be configured to disable signal transmission from a particular pin 38 of the connector 28 by ignoring signals receiving from that particular pin or connection type 44 associated with that particular pin. For example, after receiving a signal, the processor 14 may be configured to consult the state table 42 to determine whether the pin 38 or associated connection type 44 has been disabled based on the signal transmission parameter 46, and may accept or ignore that signal accordingly.

The processor 14 may be configured to implement control logic that includes the authentication module 26. The authentication module 26 may be configured to enable and disable signal transmission between the connector 28 and the processor 14 as described above based on the results of an authentication process for devices that have been attached to the connector 28. For example, the authentication module 26 may be configured to detect that a peripheral device 18 has been coupled to the computing device 12 via a local connection of the connector 28. The peripheral device 18 may be configured to use one or more connection types 44, such as, USB 2.0 for example. Before allowing free signal transmission from the peripheral device 18 and the processor 14, the authentication module may be configured to perform an authentication process 50 for at least one connection type 44 to determine whether an authenticated device configured for the at least one connection type 44 is coupled to the connector 28. In this particular example, the authentication module 26 may be configured to perform the authentication process 50 for the USB 2.0 connection type 44.

The authentication process 50 may include sending an authentication signal 52 to one or more of the plurality of pins 38 of the connector 28 mapped to the at least one connection type 44. In the illustrated example, the authentication signal may be sent to the pin labeled "PIN 1" in the example state table 42, which is mapped to the connection type 44. Although only a single pin is mapped to the connection type 44 USB 2.0, it should be appreciated that in other examples multiple pins 38 of the connector 28 may be mapped to a particular connection type 44, and the authentication signal may include signals that are sent to each of those pins.

The authentication process 50 may also include an expected authentication signal response 54 that is expected to be received from an authorized device that is also implementing the authentication process 50. Thus, if the authentication module 26 does not receive the expected authentication signal response 54 after sending the authentication signal 52, then the authentication module 26 may determine that an authenticated device is not attached to the connector 28, and may disable signal transmission until the expected authentication signal response 54 is received.

On the other hand, based on receiving the expected authentication signal response 54 on one or more of the plurality of pins 38 of the connector 28 mapped to the at least one connection type 44, the authentication module 26 may be configured to determine that the peripheral device 18 is an authentication device that is authenticated for that connection type 44. Additionally, based at least on determining that the authenticated device configured for the at least one connection type 44 is coupled to the connector 28, the authentication module 26 may be configured to enable signal transmission between the processor 14 and one or more of the plurality of pins 38 of the connector 28 mapped to the at least one connection type 44. Signal transmission may be enabled/disabled using any of the techniques described above.

The authentication signal 52 and the expected authentication signal response 54 may take any suitable form of signal. In one approach, the authentication signal 52 and/or the expected authentication signal response 54 may take the form of a voltage-based signal. For example, the authentication signal 52 may be a specific voltage such as two Volts that are applied to a specific pin of the connector 28. The expected authentication signal response 54 may then be another specific voltage such as three Volts that are applied to a specific pin of the connector 28. Thus, the processor 14 may be configured to detect whether the specific voltage for the expected authentication signal response 54 has been applied to that specific pin of the connector 28 in order to authentication the peripheral device 18. It should be appreciated that the authentication signal process 50 is not limited to the simple example described above of a predetermined voltage for the authentication signal 52 and expected authentication signal response 54. For example, the authentication process 50 may include selecting a voltage for the authentication signal 52 from a range of voltages, and the corresponding voltage for the expected authentication signal response 54 may be different depending upon the selected voltage for the authentication signal 52, and may be determine via a predetermined algorithm.

In another approach, the authentication signal 52 and the expected authentication signal response 54 may take the form of a pin sequence. For example, the authentication signal 52 may include a specific pattern or sequence of pins of the connector 28 for the authentication module 26 to send a signal, and the expected authentications signal response 54 may include a different pattern or sequence of pins of the connector 28 for receiving a signal. In these examples, the signal itself may take any suitable form, such as, for example, a voltage, a data packet, etc. In one example, the pattern or sequence of pins may include the specific pins 38 of the connector 28 that are mapped to the connection type 44 being authenticated.

In another approach, the authentication signal 52 and the expected authentication signal response 54 may take the form of a rolling code or signal based on an algorithm implemented by both the computing device 12 and the peripheral devices 18. For example, at a first authentication event, the authentication module 26 may be configured to send a first authentication signal 52, and expect to receive a corresponding expected authentication signal response 54. At a second subsequent authentication event, the authentication module 26 may increment an internal counter and send a different authentication signal 52 in accordance with the rolling code-based algorithm. The authentication module 26 may then expect to receive a different expected authentication signal response 54 in accordance with the rolling code-base algorithm. In this manner, the rolling code or signal that changes between authentication events may help prevent replay attacks that attempt to record a legitimate authentication event and use the recorded signals in a subsequent attack.

In another approach, the authentication signal 52 and the expected authentication signal response 54 may take the form of a timing between events. For example, the authentication signal 52 may take the form of a timing between signals sent to one or more pins of the connector 28, such as a first signal being sent to PIN 4 of the connector and a second signal being sent 180 milliseconds later to PIN 5 of the connector 28. The expected authentication signal response 54 may also similarly take the form of a timing such as 150 milliseconds between signals sent to the same or different pins of the connector 28. It should be appreciated that multiple timings between multiple events may be used for the authentication process 50.

In another approach, the authentication signal 52 and the expected authentication signal response 54 may take the form of a cryptographic cypher or code. For example, the authentication process 50 may be configured to use public and private cryptographic keys to authenticate peripheral devices coupled to the connector 28.

It should be appreciated that the approach discussed above are not mutually exclusive, and the authentication process 50 may implement one or more of the above approaches in concert. Additionally, it should be appreciated that the authentication process 50 may implement other techniques not specifically described herein. For example, the authentication process 50 may implement a blockchain for the rolling code or signal technique described above. As another example, the authentication process 50 may include current-based signal techniques, signal rearrangement techniques, digital signature techniques, or any other suitable cryptographic technique to authenticate devices that have been attached to the connector 28.

In one example, the authentication module 26 may implement the same authentication process 50 across all of the connection types 44, such that different peripheral devices 18 may use the same authentication process 50 to authenticate with the computing device 12.

In another example, each connection type of the plurality of connection types 44 is associated with an authentication signal 52 and an expected authentication signal response 54 used to authenticate a device for that connection type 44 that differ from respective authentication signals 50 and expected authentication signal responses 54 of each other connection type 44. That is, a first peripheral device 18 that implements the USB 2.0 connection type 44 to connect to the computing device 12 may use different authentication signals 52 and expected authentication signal responses 54 for the authentication process 50 than a second peripheral device 18 that implements the CAN Bus 2.0B connection type 44. As a specific example, the authentication process 50 for the USB 2.0 connection type may include a first set of voltage applied to a first pattern of pins of the connector 28, and the authentication process 50 for the CAN Bus 2.0B connection type may include a different set of voltages applied to a different pattern of pins of the connector 28. As another example, each connection type 44 may be respectively associated with different cryptographic keys for performing the authentication process 50. In this manner, a peripheral device that implements one connection type 44 would not be authenticated to use a different connection type to communicate with the computing device 12.

The authentication module 26 may be configured to perform the authentication process 50 for each connection type of the plurality of connection types 44 in sequence. In some examples, the authentication process 50 for different connection types 44 may involve different pins 38 of the connector 28. In the example illustrated in FIG. 4, the authentication process 50 for the USB 2.0 connection type may involve PIN 1 of the connector 28, while the authentication process 50 for the CAN Bus 2.0B connection type may involve PIN 59 of the connector 28. In these examples, the authentication module may be configured to perform the authentication process 50 for more than one of the plurality of connection types 44 concurrently. In the specific example of FIG. 4, the authentication module 26 may be configured to send the respective authentication signals 52 for the USB 2.0 and CAN Bus 2.0B connection types to their respective pins of the connector 28 concurrently. The expected authentication signal responses 54 may also be received concurrently on the those pins of the connector 28. In this manner, the authentication module 26 may sequentially or concurrently perform the authentication process 50 for each of the plurality of connection types 44 implemented by the connector 28.

Based on a result of performing the authentication process 50 for the plurality of connection types 44, the authentication module 26 may be configured to disable signal transmission between the processor 14 and one or more of the plurality of pins 38 of the connector 28 that are mapped to connection types 44 that do not have an authenticated device coupled to the connector 28. Additionally, the authentication module 26 may enable signal transmission between the processor 14 and one or more of the plurality of pins of the connector that are mapped to connection types that do have an authenticated device coupled to the connector 28. In this manner, signal transmission from pins 38 of the connector 28 that do not have a coupled authenticated device may be disabled. This authentication process 50 may potentially prevent a local actor from coupling an unauthorized device to the computing device 12 to send signals to the processor 14 that may potentially compromise the security of the computing device 12.

Turning back to FIG. 1, in one example, the authentication process 50 described above may be performed at boot-up of the computing device 12 and/or each time a new peripheral device 18 is coupled to the computing device 12. In another example, the authentication module 26 may default to disabling signal transmission for all connection types 44 until an authenticated device for a particular connection type 44 is coupled to the connector 28 and authenticated by the authentication module 26.

In one example, the authentication module 26 may be configured to store in memory, a log of peripheral devices 18 that have been coupled to the computing device 12. The authentication module 26 may be configured to manage and track peripheral devices 18 as those devices are coupled and decoupled from the computing device 12. Based on the log, the processor 14 may be configured to determine whether a new device has been coupled to the connector 28 since the last authentication process 50 was run. If the processor 14 determines that a new device has not been coupled to the connector 28, the authentication module 26 may perform a light-weight authentication process 58 instead of the full authentication process 50 described above. On the other hand, based on determining that a new device has been coupled to the connector 28, the authentication module 26 may be configured to perform the full authentication process 50 described above.

In one approach, the light-weight authentication process 58 may take the form of a shortened authentication process that has fewer steps or requires fewer computing resources than a full authentication process 50. In another approach, the light-weight authentication process 58 may skip authentication of the peripheral devices 18 if those devices have already been authenticated previously and no new devices have been coupled to the computing device 12.

As illustrated in FIG. 1 and described above, during the authentication process 50, the computing device 12 sends out the authentication signal 52 to pins of the connector 28. In one example, the authentication process 50 may be asynchronous. That is, the authentication module 26 may send the authentication signal 52, and then wait for the expected authentication signal response 54 without requiring session or confirmation that another device has received that authentication signal 52. In another example, the authentication process 50 may be synchronous. For example, the authentication module 26 may be configured to communicate with a peripheral device 18 to set up and authentication session with that device. The authentication module 26 may then perform the authentication process 50 within the authentication session, which may involve a multi-step handshake with the peripheral device 18.

In some examples, each of the peripheral devices 18 may include computing components configured to execute a peripheral authentication module 60. The peripheral authentication module 60 may be configured to identify the authentication signal 52 via the pins of the connector 28, and consult a predetermined authentication algorithm to determine the expected authentication signal response 54 that is expected by the computing device 12. The peripheral authentication module 60 may then send the expected authentication signal response 54 to the pins of the connector 28, which will be received by the processor 14 of the computing device 12. In another approach, the peripheral devices 18 may be attached to a wiring harness 62 that includes the second part 32 of the connector 28. The wiring harness 62 may further include computing components configured to execute the peripheral authentication module 60 described above instead of the peripheral devices 18. This approach may have the potential advantage of not requiring dissemination of the peripheral authentication module 60 to potential third-party manufacturers of the peripheral devices 18.

In the example illustrated in FIG. 1, the computing device 12 may further include a self-destruct circuit 64 configured to damage electronic components of the computing device 12 when activated. For example, the self-destruct circuit 64 may be configured to overvoltage the other electronic components of the computing device 12 including the processor 14 and the memory device 16.

The authentication module 26 may be configured to activate the self-destruct circuit 64 based at least on receiving an incorrect authentication signal response. In one example, the authentication module 26 may include an adjustable threshold number of incorrect responses that may be received before the self-destruct circuit 64 is activated. In another example, the authentication module 26 may interface with sensors of the computing device 12 to detect intrusions to the housing of the computing device 12. If the authentication module 26 determines that the housing of the computing 12 is being compromised, the authentication module 26 may active the self-destruct circuit 64. It should be appreciated that other parameters may be used by the authentication module 26 to determine whether or not to active the self-destruct circuit 64.

Additionally, triggering of the self-destruct circuit 64 may involve additional steps before physically damaging the electronic components of the computing device 12. For example, after determining to self-destruct, the authentication module 26 may be configured to perform a data wiping procedure on the memory device 16 and any other memory devices of the computing device 12. For example, the authentication module 26 may write over the data of the memory device 12 multiple times before activating the self-destruct circuit 64. It should be appreciated that other data wiping techniques may be used by the authentication module 26.

Figure 5:
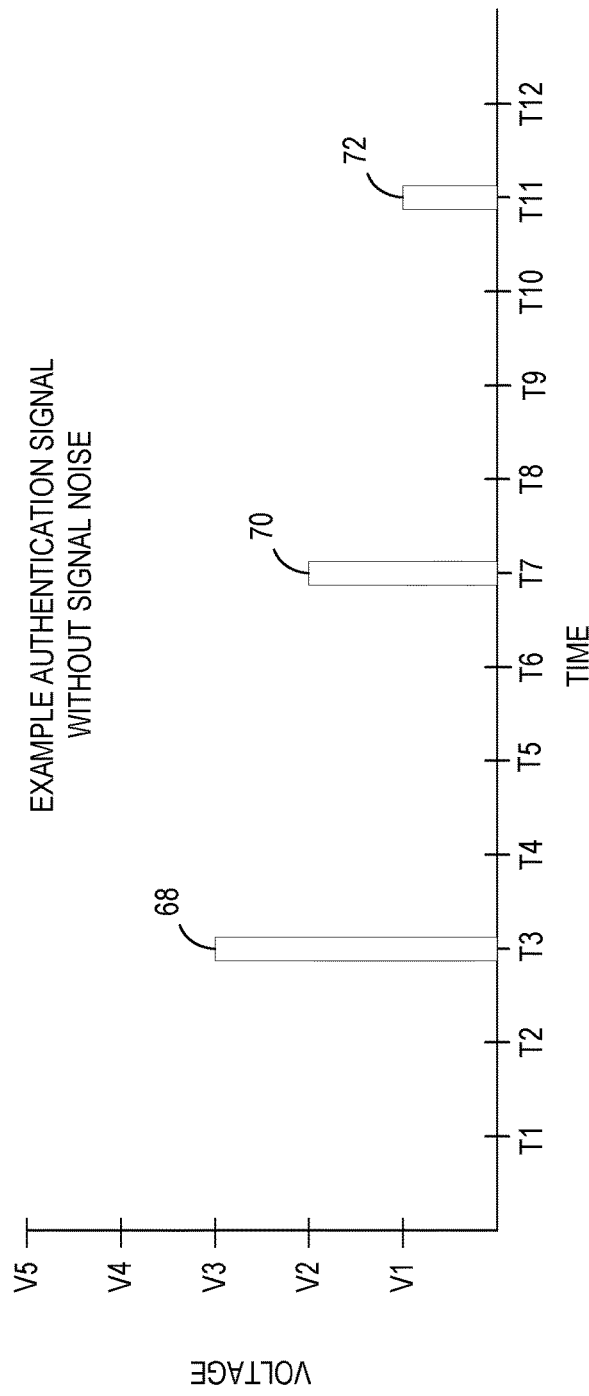
FIG. 5 shows an example authentication signal without signal noise that may be used during an authentication process performed by the computing device of FIG. 1.

In one example, to increase the difficulty of reverse-engineering the authentication process 50, the authentication module 26 may be configured to send signal noise 66 to the plurality of pins 38 of the connector 28 at least during the authentication process 50. FIG. 5 illustrates an example authentication signal 52 that may be sent to a pin of the connector 28 without signal noise 66. In the illustrated example, the authentication signal 52 is a simple example that includes three signals 68, 70, and 72 being sent to the pin at three points in time, T3, T7, and T11. The authentication signal 52 may be defined by both the actual voltages V3, V2, and V1, of those three signals, as well as the time intervals between each of those three signals. The peripheral authentication module 60 may be configured to detect that an authentication signal 52 has been sent based on detecting the first signal 68 having a voltage level of V3. Based on an internal algorithm, the peripheral authentication module 60 may then determine that the next two signals in the authentication signal 52 will occur at times T7 and T11. Then, based on detecting the three signals 68, 70, and 72, the peripheral authentication module 60 may determine the expected authentication signal response 54, and send the expected authentication signal response 54 to the pins of the connector 28. It should be appreciated the authentication signal 52 is not limited to the relatively simple example shown in FIG. 5, but may employ any of the cryptographic techniques described above.

Figure 6:
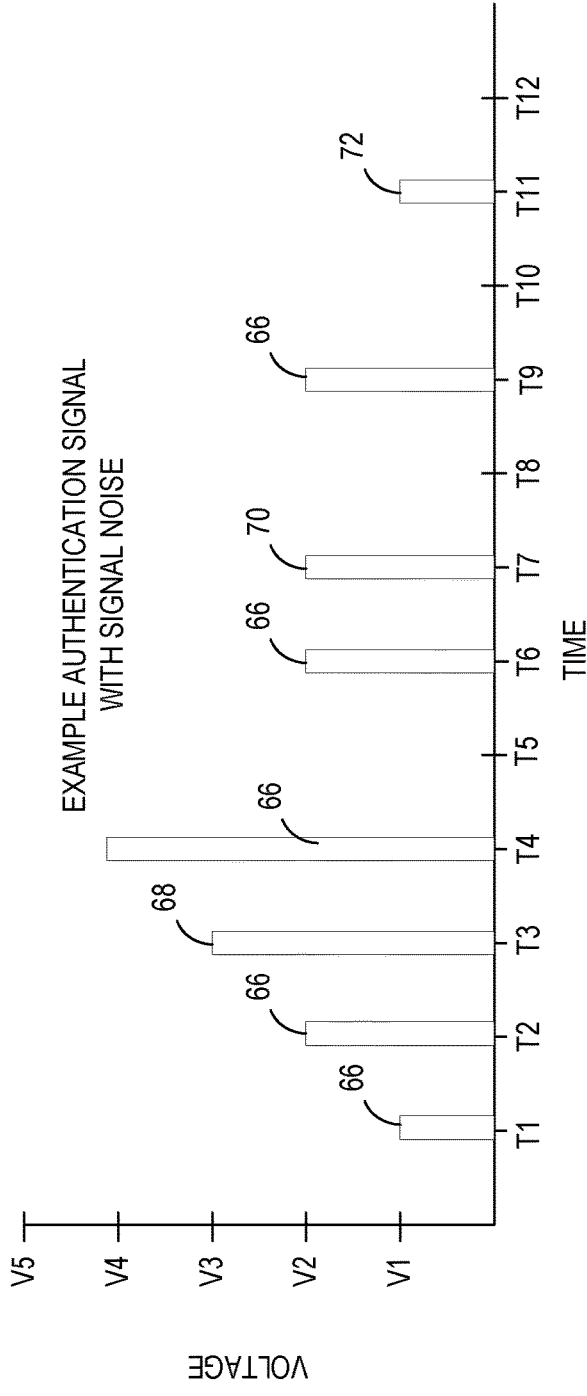
FIG. 6 shows an example authentication signal with signal noise that may be used during an authentication process performed by the computing device of FIG. 1.

FIG. 6 shows an example of the authentication signal of FIG. 5 with additional signal noise 66 wrapping the authentication signal 52. As shown, the same authentication signal having three signals 68, 70, and 72 is sent to the pin of the connector 28. However, in addition to the three signals 68, 70, and 72, the authentication module 26 may also send out signal noise 66 alongside the authentication signal 52. The signal noise 66 may take a similar form to the authentication signal 52 in order to mislead potential reverse engineering efforts. To separate the authentication signal 52 from the noise signal 66, the peripheral authentication module 60 may detect predetermined identifying aspects of the authentication signal 52. In the example illustrated in FIG. 6, a voltage of V3 may indicate the first signal 68 of the authentication signal 52. Thus, the peripheral authentication module 60 may ignore the other signals until detecting the first signal 68 having a voltage of V3.

After consulting the internal authentication algorithm, the peripheral authentication module 60 may determine that the next parts of the authentication signal 52 will occur at times T7 and T11. Thus, the peripheral authentication module 60 may ignore the other signals that do not occur at those specific time intervals. In this manner, the peripheral authentication module 60 may extract the actual authentication signal 52 from the signal noise 66, and determine the expected authentication signal response 54. It should be appreciated that the authentication signal and signal noise of FIGS. 5 and 6 are merely exemplary, and that the authentication module 26 may employ other suitable signal noise techniques to hinder reverse engineering efforts by local actors.

Figure 7:
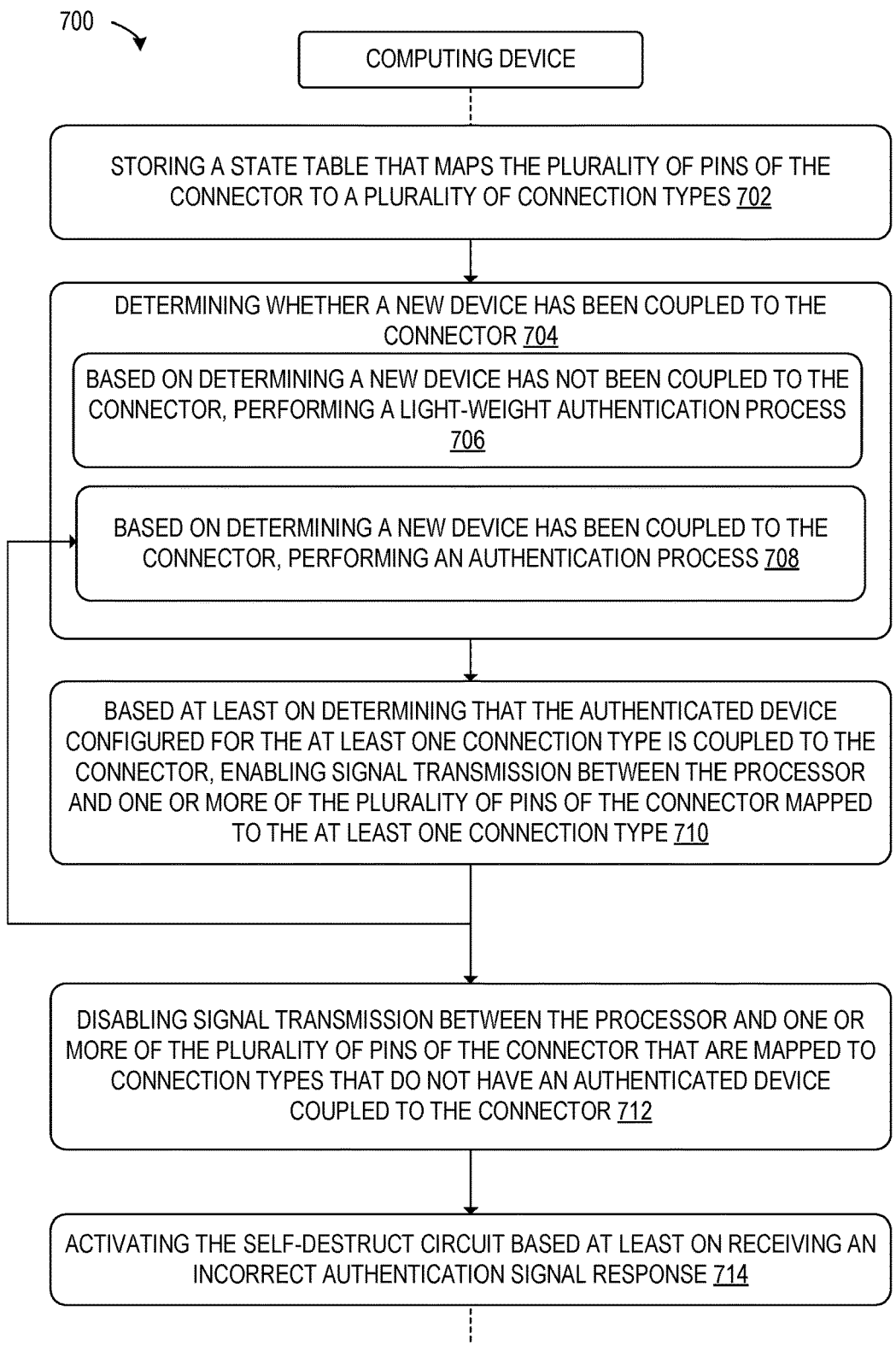
FIG. 7 shows a flowchart of a method for use with a computing device to authenticate peripheral devices that have coupled to the computing device of FIG. 1.

FIG. 7 shows a flowchart for a method 700 for performing authentication for peripheral devices in an IoT system. The method 700 may be implemented at a computing device comprising a processor having a plurality of pins that are electrically coupled to a plurality of pins of a connector. An example computing device that may implement the method 700 is illustrated in FIG. 1.

At 702, the method 700 may include storing a state table that maps the plurality of pins of the connector to a plurality of connection types. An example state table and set of connection types are described above with reference to FIG. 4. The connection types may include, for example, analog inputs and connection protocols such as USB 2.0 and CAN bus. As a few additional non-limiting examples, the connection types may include ground, digital input and output, analog voltage input and output, analog current input and output, communication ports such as COM4 UART Tx, PWM inputs and outputs, ethernet, SPI, etc. In one example, the connector may include sixty pins that may be mapped to the connection types described above. It should be appreciated that more than one pin may be mapped to each connection type.

At 704, the method 700 may include determining whether a new device has been coupled to the connector. In one example, the computing device may be configured to store in memory, a log of peripheral devices that have been coupled to the computing device. The computing device may manage and track peripheral devices as those devices are coupled and decoupled from the computing device. Based on the log, the computing device may determine whether a new device has been coupled to the connector since the last authentication process was run.

Based on determining that a new device has not been coupled to the connector, the method 700 may proceed to step 706 and may include performing a light-weight authentication process. In one approach, the light-weight authentication process may take the form of a shortened authentication process that has fewer steps or requires fewer computing resources than a full authentication process. In another approach, the light-weight authentication process may skip authentication of the peripheral devices if those devices have already been authenticated previously and no new devices have been coupled to the computing device.

Figure 8:
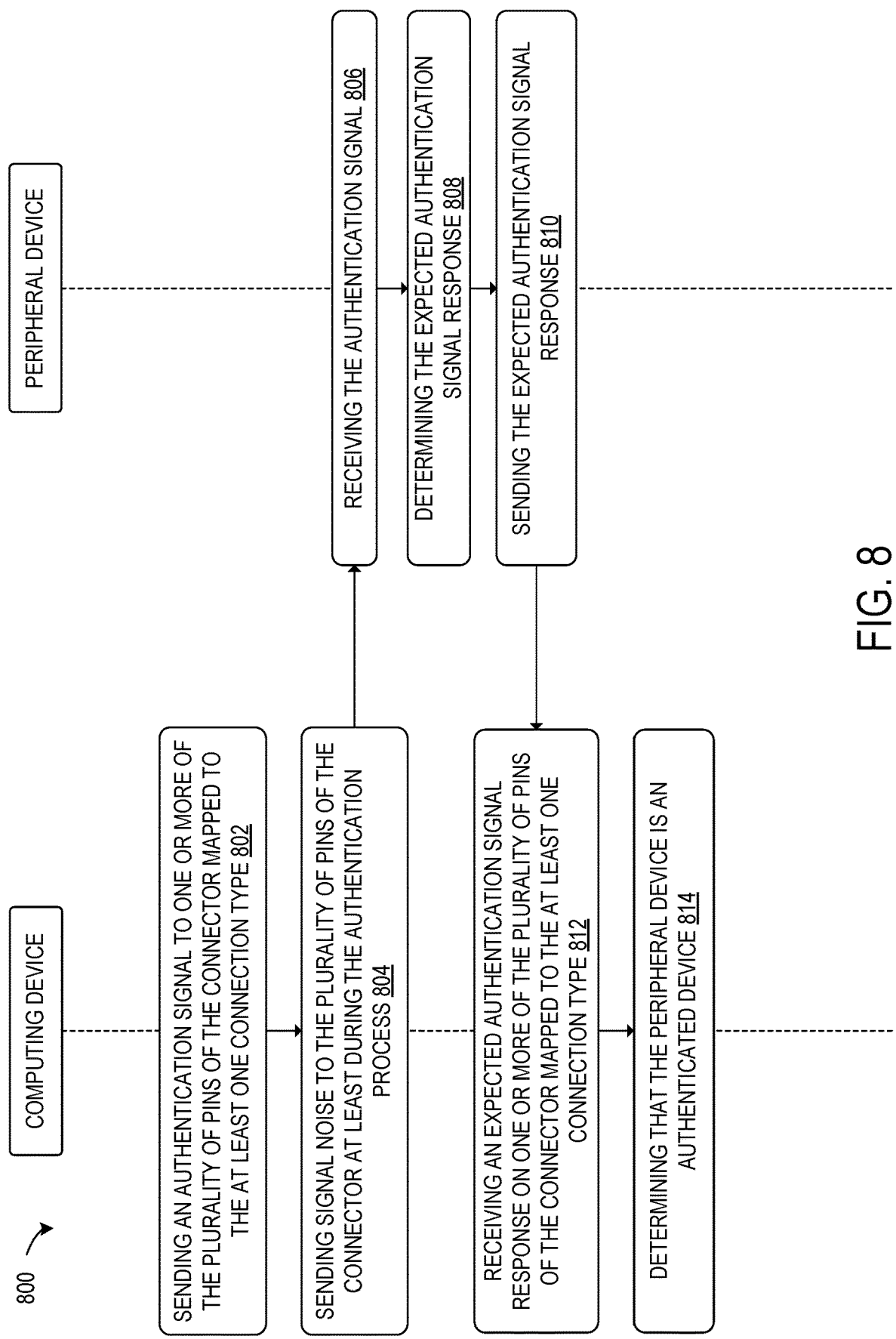
FIG. 8 shows a flowchart of a method for performing an authentication process for the method of FIG. 7.

On the other hand, based on determining that a new device has been coupled to the connector, the method 700 may instead proceed from step 704 to step 708, and may include performing an authentication process. An example authentication process is shown in FIG. 8.

The method 700 may proceed to step 710, and may include based at least on determining that the authenticated device configured for the at least one connection type is coupled to the connector, enabling signal transmission between the processor and one or more of the plurality of pins of the connector mapped to the at least one connection type. In one approach, the computing device further includes a plurality of intermediate circuit elements located between the plurality of pins of the processor and the plurality of pins of the connector that enable or disable signal transmission between the plurality of pins of the processor and the plurality of pins of the connector. Thus, at step 710, the computing device may enable signal transmission via the corresponding intermediate circuit element. In another approach, the pins of the processor of the computing device may be disabled or enabled via firmware executed on the processor. Thus, at step 710, signal transmission may be enabled or disabled by directly enabling or disabling pins of the processor of the computing device.

In one example, steps 708 and 710 may be performed for at least one connection type to determine whether an authenticated device configured for the at least one connection type is coupled to the connector. In another example, steps 708 and 710 may be performed for each connection type of the plurality of connection types. In this example, the method 700 may proceed to step 712 and may include disabling signal transmission between the processor and one or more of the plurality of pins of the connector that are mapped to connection types that do not have an authenticated device coupled to the connector.

At 714, the method 700 may include activating the self-destruct circuit based at least on receiving an incorrect authentication signal response. For example, the computing device may include a self-destruct circuit configured to overvoltage the other electronic components of the computing device. In one example, the computing device may set an adjustable threshold number of incorrect responses that may be received before the self-destruct circuit is activated. In another example, computing service may include sensors to detect intrusions to the housing of the computing device. If the computing device determine that the housing is being compromised, the computing device may active the self-destruct circuit. In some examples, the computing device also perform data wiping procedures before activating the self-destruct circuit.

FIG. 8 shows a flowchart for an example method 800 for performing an authentication process for step 708 of the method 700. As discussed above, the method 800 may be performed for at least one connection type to determine whether an authenticated device configured for the at least one connection type is coupled to the connector.

At 802, the method 800 may include sending an authentication signal to one or more of the plurality of pins of the connector mapped to the at least one connection type. The authentication signal may take the form of a voltage, a sequence or pattern of pins of the connector, a rolling signal, a timing between events, a cryptographic cypher, a cryptographic code, and a blockchain event. Example approaches are described above with reference to FIG. 4.

At 804, the method 800 may include sending signal noise to the plurality of pins of the connector at least during the authentication process. An example of signal noise is described above with reference to FIGS. 5 and 6.

At 806, the method 800 may include, at a peripheral device, receiving the authentication signal. The authentication signal may be detected via a peripheral authentication module implemented by the peripheral device or a wiring harness that couples the peripheral device to the computing device, as described above with reference to FIG. 1.

At 808, the method 800 may include, at the peripheral device, determining the expected authentication signal response. The peripheral authentication module may consult a predetermined algorithm or code to determine the expected authentication signal response based on the received authentication signal. Several cryptographic approaches are described above. At 810, the method 800 may include, at the peripheral device, sending the expected authentication signal response to the pins of the connector.

The computing device may be configured to monitor the pins of the connector for the expected authentication signal response. At 812, the method 800 may include receiving the expected authentication signal response on one or more of the plurality of pins of the connector mapped to the at least one connection type.

At 814, the method 800 may include determining that the peripheral device is an authenticated device based at least on receiving the correct authentication signal response.

In one example, each connection type of the plurality of connection types is associated with an authentication signal and an expected authentication signal response used to authenticate a device for that connection type that differ from respective authentication signals and expected authentication signal responses of each other connection type. Thus, the method 800 for the authentication process may be performed for more than one of the plurality of connection types. In one example, the authentication process for multiple connection types may be performed sequentially. In another example, the authentication process for multiple connection types may be performed concurrently. Additionally, it should be appreciated that the authentication process of method 800 may be performed synchronously or asynchronously with the peripheral device.

Using the techniques and processes described above, the computing device may implement a connector pin-based hardware security protocol that authenticates devices that are coupled to the computing device before allowing signals to be transmitted through the connector pins to the processor. By disabling communication to the processor until completion of the authentication process, even if an unknown actor is able to gain physical access to the computing device, that actor would be unable to communicatively access software being executed by the processor. In this manner, the pin-based hardware security techniques described herein provide an additional layer of hardware-based security separate from conventional software security that may be executed by the processor.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
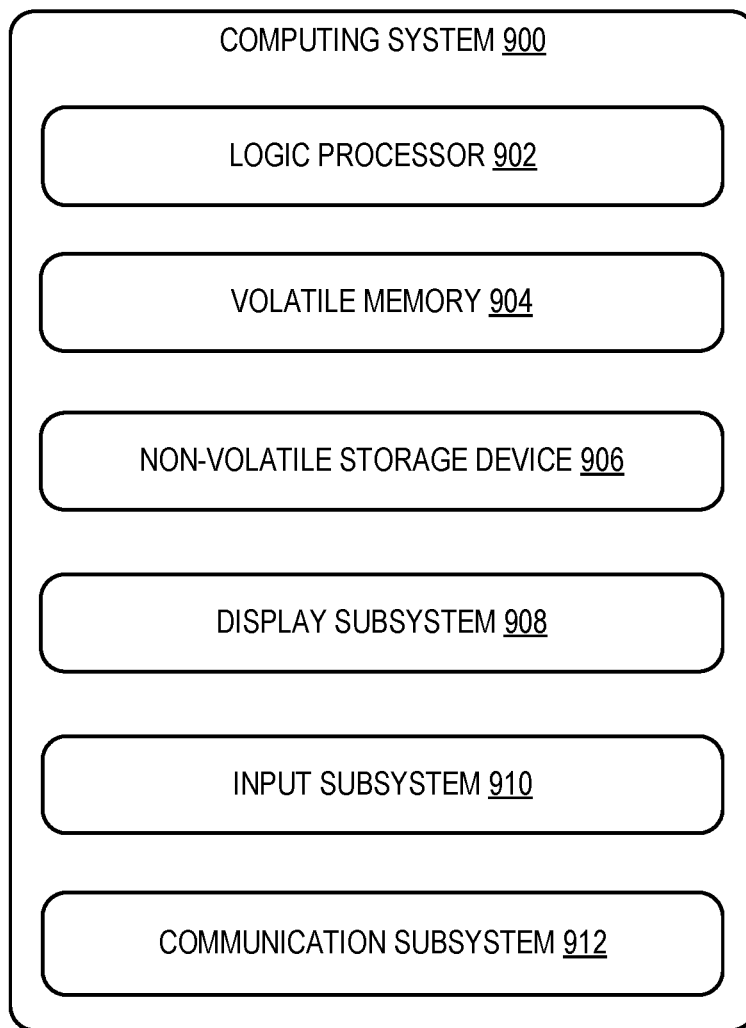
FIG. 9 shows a schematic view of an example computing environment in which the computing device of FIG. 1 may be enacted.

FIG. 9 schematically shows a non-limiting embodiment of a computing system 900 that can enact one or more of the methods and processes described above. Computing system 900 is shown in simplified form. Computing system 900 may embody the computing system 10 described above and illustrated in FIG. 1. Computing system 900 may take the form of one or more personal computers, edge computing devices, IoT devices, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
   a processor having a plurality of pins that are electrically coupled to a plurality of pins of a connector;
   a memory device storing a state table that maps the plurality of pins of the connector to a plurality of connection types;
   wherein the processor is configured to implement control logic that includes an authentication module configured to implement a connector-pin based hardware security protocol at least by:
      performing an authentication process for at least one connection type to determine whether an authenticated device configured for the at least one connection type is coupled to the connector at least in part by:
         sending an authentication signal to one or more of the plurality of pins of the connector mapped to the at least one connection type; and
         receiving an expected authentication signal response comprising a voltage at two or more of the plurality of pins of the connector mapped to the at least one connection type;
      based at least on determining that the authenticated device configured for the at least one connection type is coupled to the connector, enabling signal transmission between the processor and one or more of the plurality of pins of the connector mapped to the at least one connection type;

performing the authentication process for each connection type of the plurality of connection types before enabling or disabling that connection type;

disabling signal transmission between the processor and one or more of the plurality of pins of the connector that are mapped to connection types that do not have an authenticated device coupled to the connector; and enabling signal transmission between the processor and one or more of the plurality of pins of the connector that are mapped to connection types that do have an authenticated device coupled to the connector.

2. The computing device of claim 1, wherein each connection type of the plurality of connection types is associated with an authentication signal and an expected authentication signal response used to authenticate a device for that connection type that differ from respective authentication signals and expected authentication signal responses of each other connection type.

3. The computing device of claim 1, wherein the authentication module is configured to perform the authentication process for more than one of the plurality of connection types concurrently.

4. The computing device of claim 1, further comprising a plurality of intermediate circuit elements located between the plurality of pins of the processor and the plurality of pins of the connector that enable or disable signal transmission between the plurality of pins of the processor and the plurality of pins of the connector.

5. The computing device of claim 1, wherein the authentication signal and the expected authentication signal response are signals selected from the group consisting of a voltage, a sequence or pattern of pins of the connector, a rolling signal, a timing between events, a cryptographic cypher, a cryptographic code, and a blockchain event.

6. The computing device of claim 1, wherein the authentication module is further configured to send signal noise to the plurality of pins of the connector at least during the authentication process.

7. The computing device of claim 1, further comprising:
a self-destruct circuit configured to damage electronic components of the computing device when activated; and
wherein the authentication module is configured to activate the self-destruct circuit based at least on receiving an incorrect authentication signal response.

8. The computing device of claim 1, wherein the authentication module is further configured to:
determine whether a new device has been coupled to the connector;
based on determining a new device has not been coupled to the connector, perform a light-weight authentication process; and
based on determining a new device has been coupled to the connector, perform the authentication process.

9. A method comprising:
at a computing device comprising a processor having a plurality of pins that are electrically coupled to a plurality of pins of a connector:
storing a state table that maps the plurality of pins of the connector to a plurality of connection types;
performing an authentication process for at least one connection type to determine whether an authenticated device configured for the at least one connection type is coupled to the connector at least in part by:
sending an authentication signal to one or more of the plurality of pins of the connector mapped to the at least one connection type; and
receiving an expected authentication signal response comprising a voltage at two or more of the plurality of pins of the connector mapped to the at least one connection type;
based at least on determining that the authenticated device configured for the at least one connection type is coupled to the connector, enabling signal transmission between the processor and one or more of the plurality of pins of the connector mapped to the at least one connection type;
performing the authentication process for each connection type of the plurality of connection types before enabling or disabling that connection type;
disabling signal transmission between the processor and one or more of the plurality of pins of the connector that are mapped to connection types that do not have an authenticated device coupled to the connector; and
enabling signal transmission between the processor and one or more of the plurality of pins of the connector that are mapped to connection types that do have an authenticated device coupled to the connector.

10. The method of claim 9, wherein each connection type of the plurality of connection types is associated with an authentication signal and an expected authentication signal response used to authenticate a device for that connection type that differ from respective authentication signals and expected authentication signal responses of each other connection type.

11. The method of claim 9, further comprising performing the authentication process for more than one of the plurality of connection types concurrently.

12. The method of claim 9, wherein the computing device further includes a plurality of intermediate circuit elements located between the plurality of pins of the processor and the plurality of pins of the connector that enable or disable signal transmission between the plurality of pins of the processor and the plurality of pins of the connector.

13. The method of claim 9, wherein the authentication signal and the expected authentication signal response are signals selected from the group consisting of a voltage, a sequence or pattern of pins of the connector, a rolling signal, a timing between events, a cryptographic cypher, a cryptographic code, and a blockchain event.

14. The method of claim 9, further comprising sending signal noise to the plurality of pins of the connector at least during the authentication process.

15. The method of claim 9, wherein the computing device further includes a self-destruct circuit configured to damage electronic components of the computing device when activated; and
wherein the method further comprises activating the self-destruct circuit based at least on receiving an incorrect authentication signal response.

16. The method of claim 9, further comprising:
determining whether a new device has been coupled to the connector;
based on determining a new device has not been coupled to the connector, performing a light-weight authentication process; and based on determining a new device has been coupled to the connector, performing the authentication process.

17. A computing device comprising:
a processor having a plurality of pins that are electrically coupled to a plurality of pins of a connector;
wherein the processor is configured to implement control logic that includes an authentication module configured to implement a connector-pin based hardware security protocol at least by:
  performing an authentication process to determine whether an authenticated device is coupled to the connector at least in part by:
    contemporaneously sending an authentication signal to more than one of the plurality of pins of the connector;
    receiving an expected authentication signal response on more than one of the plurality of pins of the connector;
  based at least on determining that the authenticated device is coupled to the connector, enabling signal transmission between the processor and the plurality of pins of the connector;
  performing the authentication process for each connection type of a plurality of connection types before enabling or disabling that connection type;
  disabling signal transmission between the processor and one or more of the plurality of pins of the connector that are mapped to connection types that do not have an authenticated device coupled to the connector; and
  enabling signal transmission between the processor and one or more of the plurality of pins of the connector that are mapped to connection types that do have an authenticated device coupled to the connector.

18. The computing device of claim 17, wherein each connection type of the plurality of connection types is associated with an authentication signal and an expected authentication signal response used to authenticate a device for that connection type that differ from respective authentication signals and expected authentication signal responses of each other connection type.

19. The computing device of claim 17, wherein the authentication module is configured to perform the authentication process for more than one of the plurality of connection types concurrently.

20. The computing device of claim 17, wherein the authentication signal and the expected authentication signal response are signals selected from the group consisting of a voltage, a sequence or pattern of pins of the connector, a rolling signal, a timing between events, a cryptographic cypher, a cryptographic code, and a blockchain event.

* * * * *